(12) United States Patent
Schmelzer

(10) Patent No.: US 8,905,830 B2
(45) Date of Patent: Dec. 9, 2014

(54) CROSS VENTILATION CURTAIN SYSTEM

(75) Inventor: Richard Schmelzer, Garnavillo, IA (US)

(73) Assignee: Development Resources of Iowa, Inc., Strawberry Point, IA (US)

( * ) Notice: Subject to any disclaimer, the term of this patent is extended or adjusted under 35 U.S.C. 154(b) by 1190 days.

(21) Appl. No.: 12/650,000

(22) Filed: Dec. 30, 2009

(65) Prior Publication Data

US 2011/0155330 A1    Jun. 30, 2011

(51) Int. Cl.
| F24F 6/00 | (2006.01) |
| F24F 11/00 | (2006.01) |
| A01K 1/00 | (2006.01) |
| H02K 7/116 | (2006.01) |
| H02K 7/14 | (2006.01) |

(52) U.S. Cl.
CPC ............. *F24F 11/0001* (2013.01); *A01K 1/007* (2013.01); *A01K 1/0082* (2013.01); *F24F 6/00* (2013.01); *H02K 7/116* (2013.01); *F24F 2006/001* (2013.01); *H02K 7/14* (2013.01)
USPC ........................................................ 454/337

(58) Field of Classification Search
USPC .................. 454/337, 239, 274; 160/120, 133
See application file for complete search history.

(56) References Cited

U.S. PATENT DOCUMENTS

| 3,306,344 A * | 2/1967 | Youngs .......................... 160/241 |
| 5,146,762 A * | 9/1992 | Atkins ............................. 62/171 |
| 5,492,082 A * | 2/1996 | Krevinghaus et al. ......... 119/448 |
| 6,612,359 B1 * | 9/2003 | Moreau .......................... 160/120 |
| 7,152,653 B1 * | 12/2006 | Kubly et al. ................... 160/120 |

* cited by examiner

*Primary Examiner* — Steven B McAllister
*Assistant Examiner* — Brittany Towns
(74) *Attorney, Agent, or Firm* — Greer, Burns & Crain, Ltd.

(57) ABSTRACT

Plural vertically aligned curtain sections form a first wall of a structure and are each coupled to a respective manual or powered rotary drive by means of a respective elongated, roll-up rod disposed in a lower hem, and extending the length, of the curtain section. The rotary drives are attached to horizontally spaced, vertical tracks for limiting the vertical drives, the roll-up rods and each curtain's lower hem to vertical motion in rolling up and unrolling the curtain sections. A water curtain maintained in a moist condition is disposed adjacent the inner surfaces of the curtain sections, with fans disposed on a second opposed wall of the structure for drawing air through the space occupied by the curtain sections for providing moist airflow through the structure's interior. Moist airflow and cooling are precisely controlled by controlling the gap between a pair of adjacent vertically spaced curtain sections.

29 Claims, 8 Drawing Sheets

CROSS VENTILATION CURTAIN SYSTEM

FIELD OF THE INVENTION

This invention relates generally to roll-up curtain systems and is particularly directed to an arrangement of vertically spaced roll-up curtain sections for controlling the flow of moist air through a generally closed structure.

BACKGROUND OF THE INVENTION

Flexible, lightweight curtain systems are increasingly being used as outer walls for structures housing animals in agricultural environments. These movable curtain systems frequently include long spans of vertically spaced roll-up curtain sections which are opened and closed for the purpose of controlling the environment within the structure for the benefit of the animals therein. The curtains are opened at high temperatures, closed at low temperatures, and are intermediately positioned at moderate temperatures. The goal is to precisely control the openings formed by the curtains for optimum comfort of the animals.

As the length and weight of the curtain sections increases to accommodate larger building structures, the curtain support and drive mechanisms have increased in size and complexity. This trend has made it more difficult to precisely control the extent to which the curtain sections are open or closed. This has also led to increased size and numbers of support/control mechanisms which has reduced the open portion of the curtain wall through which air flows into and out of the structure.

The present invention addresses the aforementioned limitations of the prior art by providing a compact support/control mechanism capable of vertically displacing long sections of vertically spaced curtains for precisely controlling airflow into and out of a generally closed structure. In addition, the present invention contemplates the use of water curtains disposed adjacent to and inwardly of the curtain sections for directing in a controlled manner moist air through the enclosed space in precisely controlling the environment therein for optimum comfort.

OBJECTS AND SUMMARY OF THE INVENTION

According, it is an object of the present invention to provide improved cooling in a generally closed space by adding water to an airflow through the space and selectively controlling the airflow throughout the space.

It is another object of the present invention to provide improved cooling for animals in a generally closed space by controlling the rate of flow of moist air through the space to allow for increased relative humidity of the air while avoiding condensation on the animals.

It is a further object of the present invention to provide a multi-section curtain arrangement forming a wall of a generally closed room through which air is drawn which allows for precise control of airflow through the room and the environment within the room.

Yet another object of the present invention is to provide a multi-section roll-up curtain arrangement forming a wall of a generally closed room which allows for increased airflow through the room by minimizing the width of the curtain roll-up drive and support mechanism.

A still further object of the present invention is to provide a multi-section roll-up curtain arrangement forming a wall which provides increased comfort at high outside temperatures for cows in a milking parlor.

Another object of the present invention is to roll-up or unroll plural vertically aligned curtain sections independently of one another to provide more precise control of the openings between adjacent curtain sections and the flow of air through the curtain sections.

A further object of the present invention is to provide a roll-up curtain system for controlling air flow through a generally closed space capable of operating equally well under either manual operation or motor driven operation.

The present invention contemplates for use in a generally closed space defined by plural structural members and having first and second spaced lateral peripheral portions, wherein air is drawn through the first lateral peripheral portion into the space and exits via the second lateral peripheral portion, and wherein water is introduced in the airflow for cooling the space, an arrangement for controlling the moist airflow in the enclosed space comprising: first upper, first intermediate and first lower curtain sections arranged in vertical spaced alignment and covering the first lateral peripheral portion of the space, wherein each of the first upper, intermediate and lower curtain sections includes a respective upper edge portion fixedly attached to a structural member and a respective free lower edge portion attached to a respective roll-up rod; first, second and third rotary drive and trolley combinations each respectively coupled to a respective roll-up rod of said first upper, intermediate and lower curtain sections for independently rolling up or unrolling the curtain sections relative to a fixed upper edge portion of the curtain section, wherein a rotary drive and trolley combination moves upward to roll-up its associated curtain section and moves downward to unroll its associated curtain section; and a vertical guide coupled to the rotary drive and trolley combinations for limiting movement of the roll-up rods attached to a lower edge portion of each curtain section to a generally vertical plane during rolling up and unrolling of the curtain sections in controlling airflow in the generally closed space, the vertical guide including a first track arrangement engaging the first and third rotary drive and trolley combinations and a second track arrangement engaging the second rotary drive and trolley combination, wherein the first and second track arrangements are arranged in a horizontally spaced manner from one another allowing the first and third rotary drive and trolley combinations and the second rotary drive and trolley combination to move upward and downward in a vertically offset manner.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENTS

Figure 1:
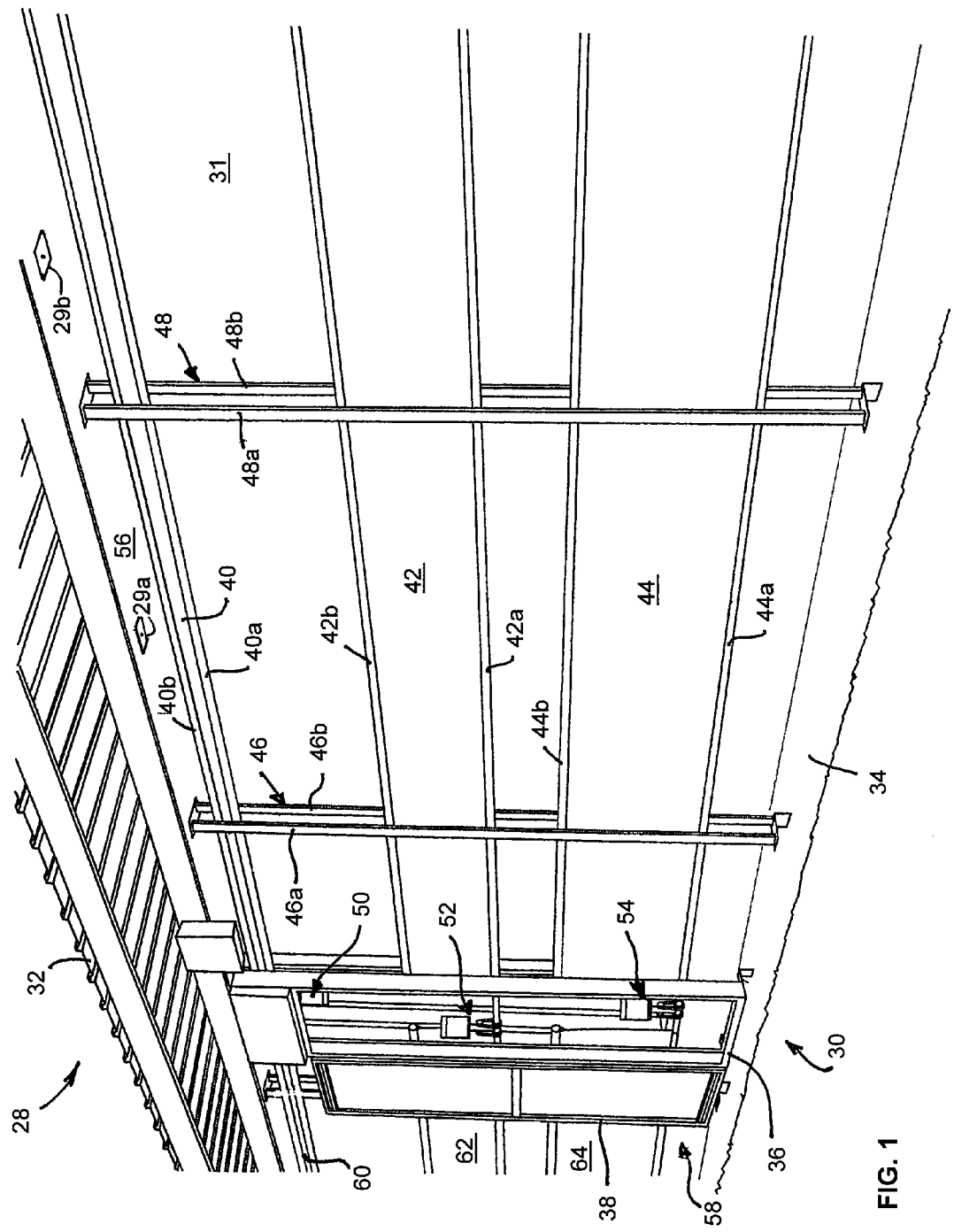
FIG. 1 is a perspective view of the outside of a multi-section curtain system forming an outer wall of a generally enclosed structure.
Figure 2:
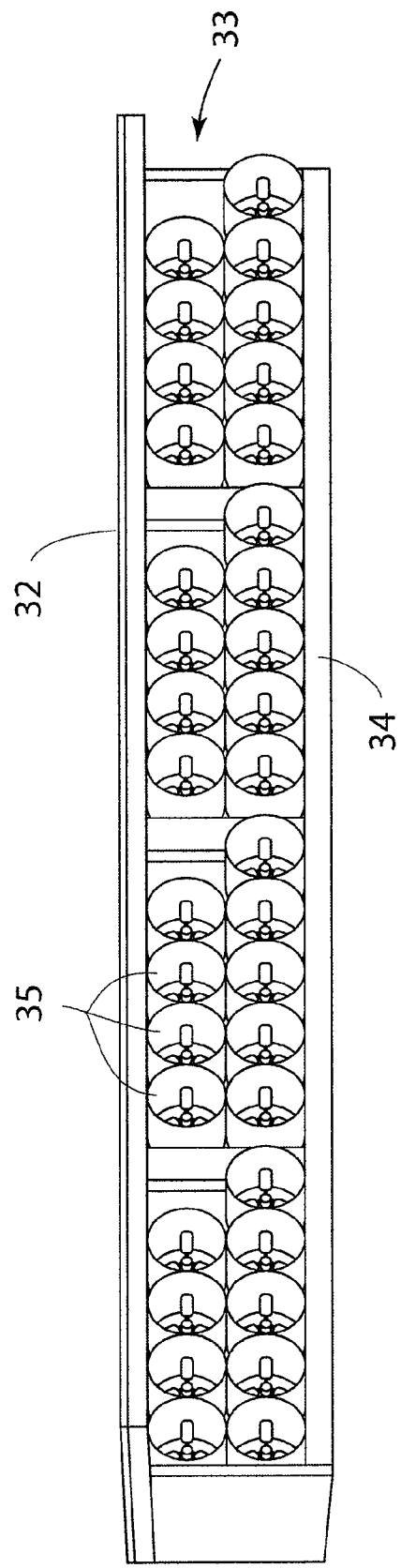
FIG. 2 is an outer perspective view of a second wall in the structure which includes the multi-curtain system shown in FIG. 1, where the wall shown in FIG. 2 includes plural-spaced exhaust fans for moving air through the spaced defined by the structure.
Figure 3:
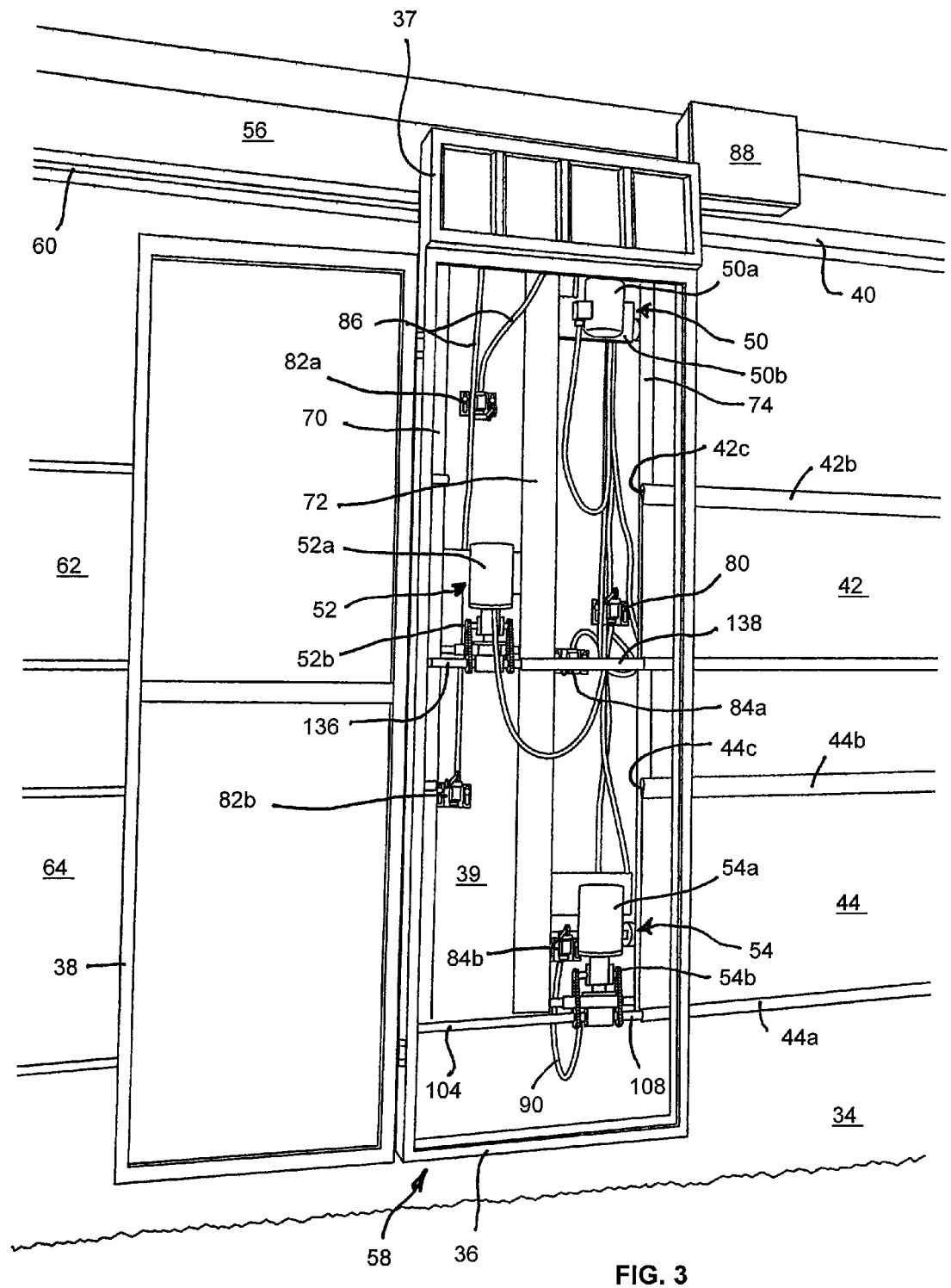
FIG. 3 is a perspective view of a multi-drive arrangement for use in individually controlling the multi-section curtain system of the present invention.
Figure 4:
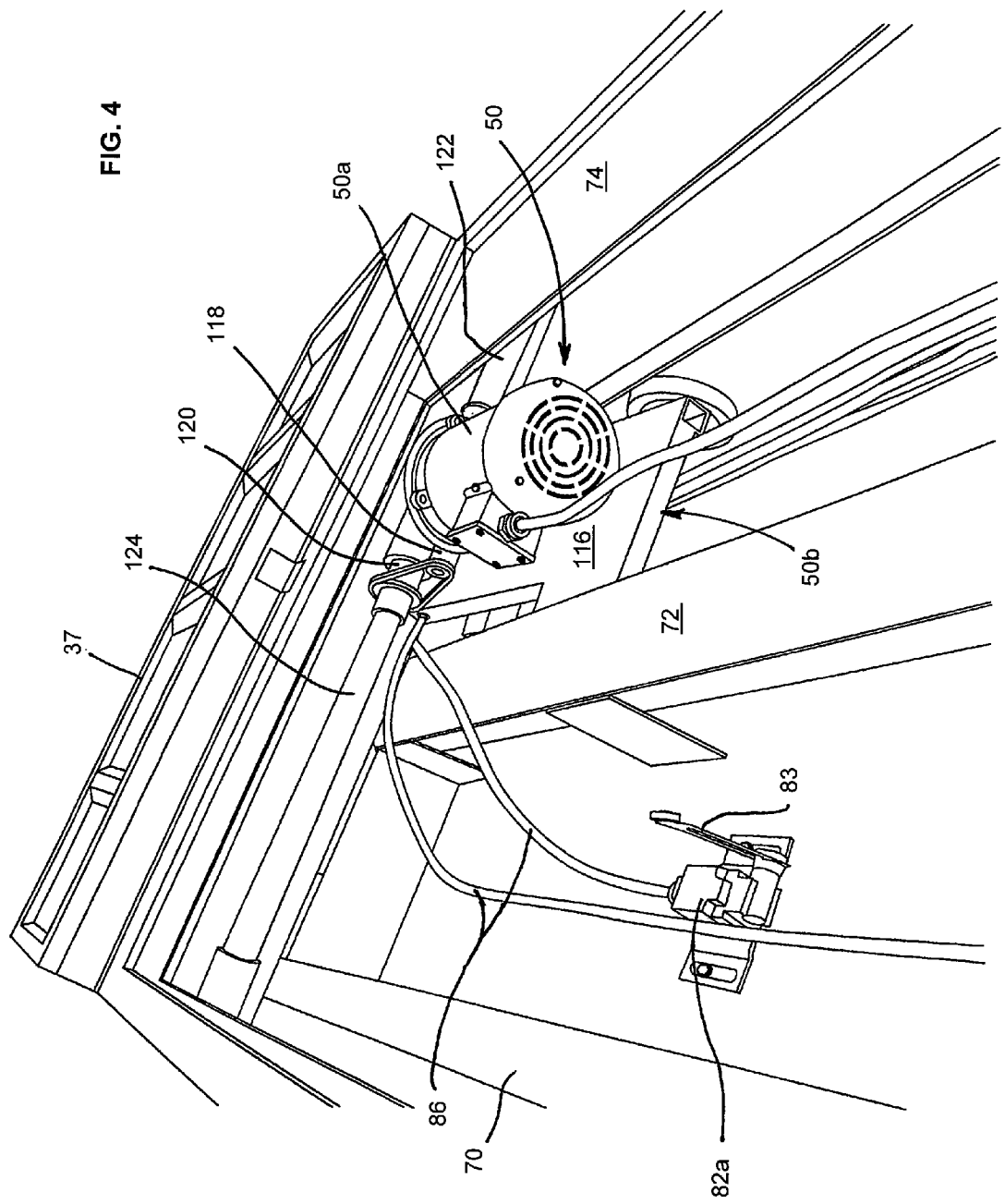
FIG. 4 is a perspective view of an upper portion of the curtain drive and support arrangement for use in the cross ventilation curtain system of the present invention.
Figure 5:
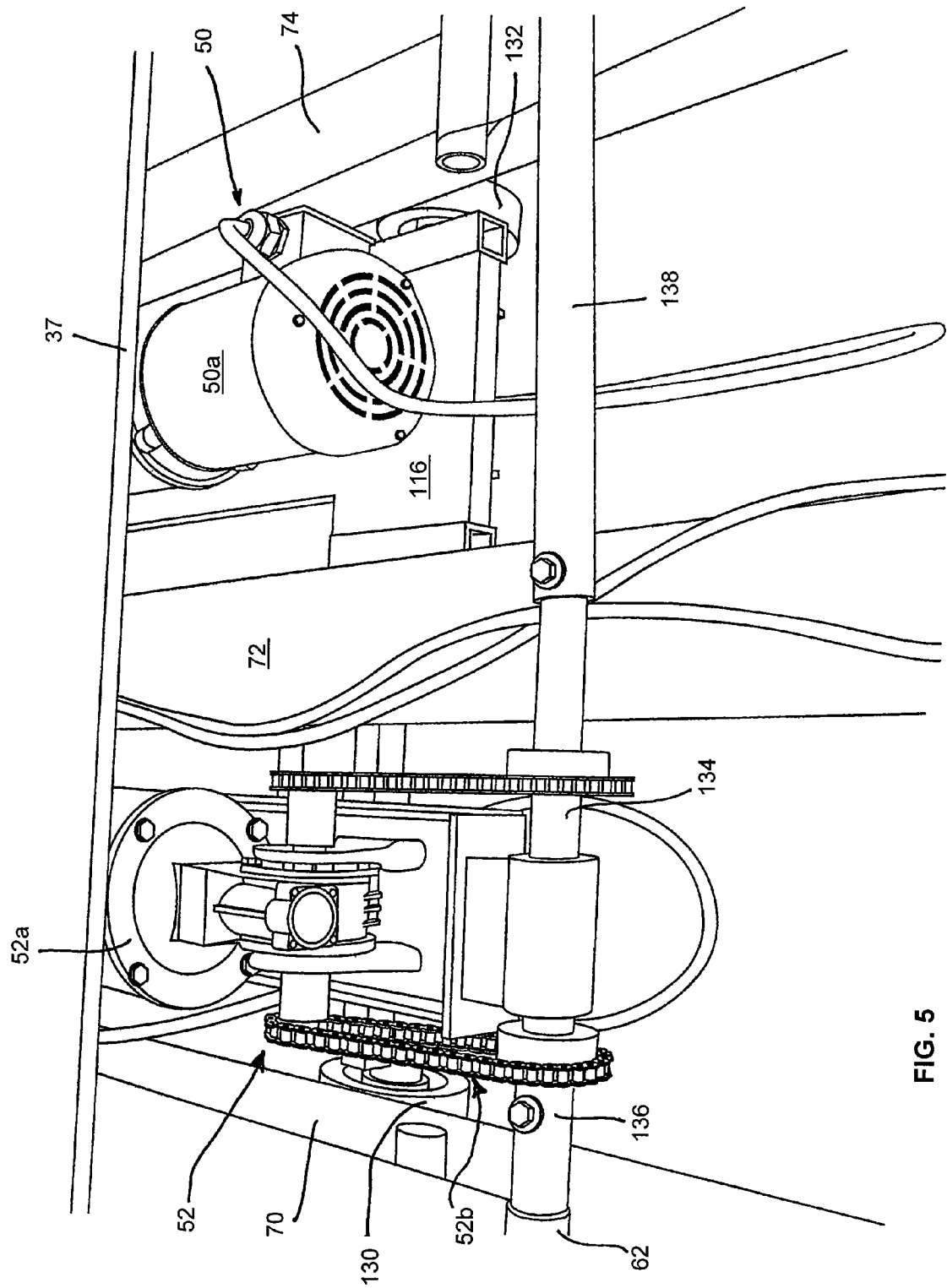
FIG. 5 is a perspective view showing the position of a pair of support/drive mechanisms for use in the cross ventilation curtain system of the present invention.
Figure 6:
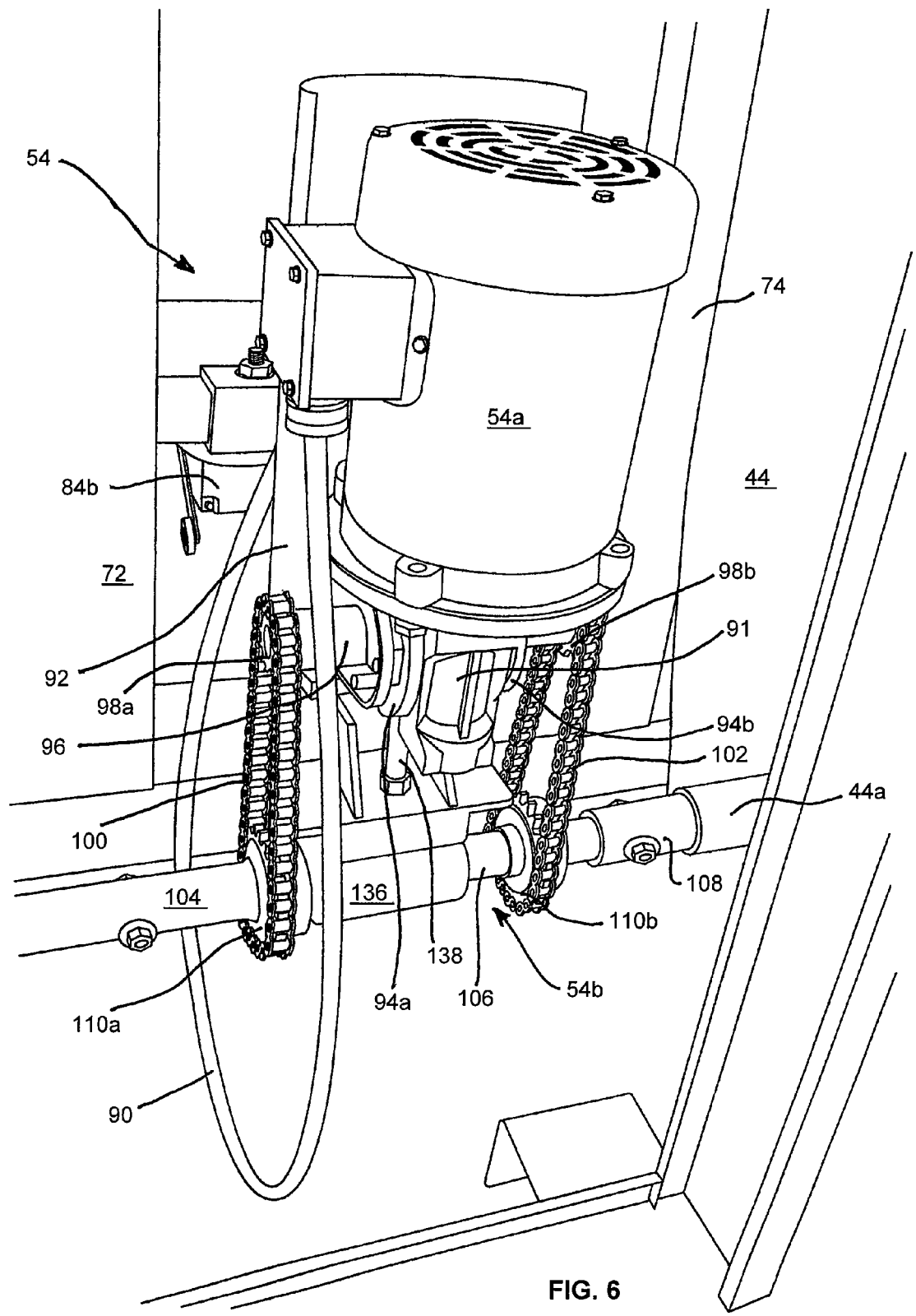
FIG. 6 is a perspective view showing additional details of a curtain support/drive mechanism used in a preferred embodiment of the cross ventilation curtain system of the present invention.
Figure 7:
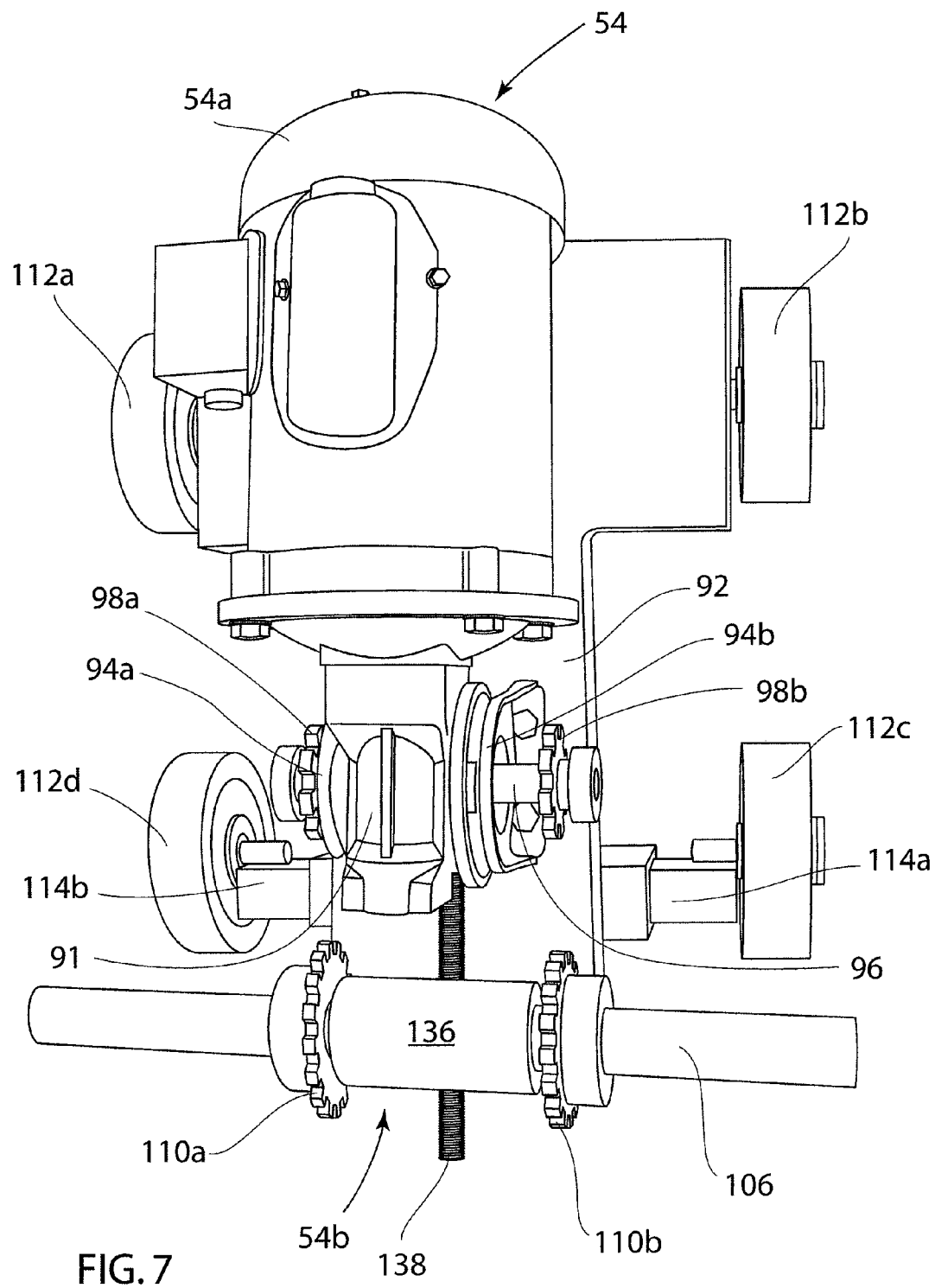
FIG. 7 is a perspective view of a curtain support/drive mechanism used in a preferred embodiment of the present invention.

Referring to FIG. 1, there is shown an outer perspective view of a cross ventilation curtain system 30 in accordance with the principles of the present invention. FIG. 2 is a perspective view of a second wall 33 of the structure 28 in which the cross ventilation curtain system 30 of the present invention is incorporated. FIG. 3 is a front perspective view of a curtain controller 58 for use in the cross ventilation curtain system 30 of the present invention. FIG. 4 is a lower perspective view of an upper portion of the curtain controller 58 for supporting and controlling the upper curtain sections of the inventive cross ventilation curtain system 30. FIG. 5 is a perspective view of a portion of the cross ventilation curtain system's curtain controller 58 showing additional details of the drive and support arrangements for the upper and intermediate curtain sections of the cross ventilation curtain system. FIG. 6 is a perspective view of the lower support/drive mechanism 54 used in supporting and controlling the operation of the cross ventilation curtain system's lower curtain sections. FIG. 7 is a perspective view of the lower support/drive mechanism 54 which provides support and control of the cross ventilation curtain system's lower curtain sections, it being understood that the corresponding support/drive mechanisms for the cross ventilation curtain system's upper and intermediate curtain sections are the same in configuration, structure and operation as the support/drive mechanism shown in FIG. 7 for the lower curtain sections.

Cross ventilation curtain system 30 forms one wall of a generally closed structure 28 which also includes a roof 32 and a second wall shown as element 33 in the perspective view of FIG. 2. As shown in FIG. 2, an upper portion of the second wall 33 adjoins the structure's roof 32 and is positioned on and supported by the structure's foundation, or floor, 34. The second wall 33 is comprised of plural exhaust fans 35 which draw air through the first wall formed of the cross ventilation curtain system 30. After the flow of air passes through the cross ventilation curtain system 30, it transits the interior space of the structure 28 and exits the structure via the plural exhaust fans 35 forming the structure's second wall 33. Disposed within the structure in closely spaced relation to the cross ventilation curtain system 30 is a water curtain 31 which extends the height and width of the cross ventilation curtain system as shown in FIG. 1. Water curtain 31 is conventional in design and operation and is comprised of an air permeable material with water retention properties. In operation, water is deposited on the upper edge portion of the water curtain 31 and is allowed to travel downward on the water curtain so as to introduce moisture in the flow of air drawn through the water curtain by the aforementioned exhaust fans 35 disposed in a spaced manner across the structure from the water curtain. By directing airflow through the water-bearing water curtain 31, cool moist air is drawn through the interior space of the structure by means of the aforementioned exhaust fans 35. In the environment in which the cross ventilation curtain system 30 of the present invention is intended for use, the moist air is used to maintain a cool, comfortable environment for the benefit of cows being milked within the structure. The cross ventilation curtain system 30 of the present invention allows for precise control of airflow through the water curtain 31 so as to provide a desired moisture level within the airflow for optimum comfort, while preventing condensation of the moisture on the animals and the undesirable health impact that this would have on them. In another embodiment, moisture is introduced in the airflow between the curtain sections 40, 42 and 44 and through the interior space of structure 28 not by the water curtain 31, but rather by at least one mist device disposed in or adjacent to the generally closed structure 28, where two mist devices 29a and 29b are shown in FIG. 1. These mist devices 29a, 29b introduce water in the form of a fine mist as it passes between curtain sections 40, 42 and 44 and flows through the interior space of the structure 28.

Cross ventilation curtain system 30 includes the aforementioned first upper, intermediate and lower curtain sections 40, 42 and 44 disposed in spaced vertical alignment and extending laterally over an outer portion of the structure 28. Disposed adjacent one end of each of the first upper, intermediate and lower curtain sections 40, 42 and 44 are second upper, intermediate and lower curtain sections 60, 62 and 64. Disposed between the first and second curtain sections is a curtain controller 58. Curtain controller 58 simultaneously controls the operation of each of the first and second upper, intermediate and lower curtain sections as described in detail below. The following description is directed to the first upper, intermediate and lower curtain sections 40, 42 and 44, it being understood that this description applies equally as well to the construction, configuration and operation of the second upper, intermediate and lower curtain sections 60, 62 and 64.

An upper edge portion of the first upper curtain section 40 is securely attached to an upper structural member 56 of the structure 28 in a conventional manner such as by fasteners or by a mounting member (not shown). The lower end portion of the first upper curtain section 40 is in the form of a hem 40a which is adapted to receive a first curtain drive/support rod 122 which is shown in FIG. 4. The upper edge portion 42b of the intermediate curtain section 42 is adapted to receive an upper support rod 42c disposed within a hem formed in the upper edge portion. The intermediate curtain section's upper support rod 42c is securely attached to the housing 36 of the curtain controller 58 as well as to first and second guide/support arrangement 46 and 48 disposed in a spaced manner along the lengths of the first upper, intermediate and lower curtain sections 40, 42 and 44. The first and second guide/support arrangements 46, 48 respectively include outer and inner members 46a, 46b and 48a, 48b for engaging the outer and inner surfaces of the three curtain sections and maintaining these curtain sections in generally vertical alignment when in fixed position as well as during unrolling and roll-up of the curtain sections. In addition, the first and second guide/support arrangements 46, 48 are attached to and provide support for the first intermediate and lower curtain sections 42 and 44. Thus, an upper edge portion 44b of the first lower curtain section 44 is coupled to an elongated, linear support rod 44c which, in turn, is attached to the housing 36 of the curtain controller 58 as well as to the first and second guide/ support arrangements 46 and 48 for supporting the first lower curtain section. The first lower curtain section 44 is also provided with a curtain hem 44a on its lower edge which contains a third curtain drive rod 108 described below. Each of the second upper, intermediate and lower curtain sections 60, 62 and 64 is configured, mounted and positioned within structure 28 and operates in a manner similar to that of the above described first upper, intermediate and lower curtain sections 40, 42 and 44.

Referring to FIG. 3, details of the configuration and operation of the cross ventilation curtain system's controller 58 will now be described. Curtain controller 58 includes a generally closed housing 36 including a rectangular frame and a top panel 37, a rear wall 39, and a pivoting front door 38 for enclosing the various support and control mechanisms described in detail below. Curtain controller 58 further includes a first upper support/drive mechanism 50 for providing support and control for the first and second upper curtain sections 40, 60. Curtain controller 58 also includes a second intermediate support/drive mechanism 52 and a third lower support/drive mechanism 54 for providing support and control respectively for the intermediate curtain sections 42, 62 and for the lower curtain sections 44, 64. Disposed within the curtain controller 58 are first, second and third vertical guide members 70, 72 and 74 which extend from the top of the first and second upper curtain sections 40, 60 to the bottom of the first and second lower curtain sections 44, 64. The first, second and third vertical guide members 70, 72 and 74 engage and maintain the first upper, second intermediate and third lower support/drive mechanisms 50, 52 and 54 in a fixed orientation and in vertical alignment during rolling up and unrolling of the various curtain sections as well as when the curtain sections are in fixed position.

Curtain controller 58 further includes three pairs of upper and lower limit switches, with each pair of limit switches controlling the upper and lower position limits of a respective one of the support/drive mechanisms. Thus, limit switch 80 limits the lowest position of the first upper support/drive mechanism 50. An upper limit switch limits the uppermost position of the first upper support/drive mechanism 50, but this limit switch is now shown in the figures for simplicity. Similarly, second upper and lower limit switches 82a and 82b respectively limit the uppermost and lowest positions of the second intermediate support/drive mechanism 52. Finally, third upper and lower limit switches 84a and 84b limit the uppermost and lowest positioning limits of the third lower support/drive mechanism 54. As shown for the case of the second upper limit switch 82a in FIG. 4, each of the limit switches includes a pivoting arm which is identified as element 83 for the second upper limit switch. A position limit switch is triggered when a curtain drive/support rod attached to a lower or intermediate hem portion of a curtain section engages and displaces the limit switch's pivoting arm which results in termination of further movement of the curtain section's lower or intermediate hem portion.

The structure, configuration and operation of a support/drive mechanism used for supporting and controlling each of the curtain sections will now be described in detail in terms of FIGS. 6 and 7. FIG. 6 is a perspective view of the third lower support/drive mechanism 54 installed in the cross ventilation curtain system 30 of the present invention, while FIG. 7 is a perspective view of this support/drive mechanism removed from the system to illustrate additional details of its structure and components. The first upper and second intermediate support drive mechanisms 50, 52 are configured and operate similarly to the third lower support/drive mechanism 54. The third lower support/drive mechanism 54 includes a generally planar support panel 92 comprised of a high strength material such as metal or plastic. The third lower support/drive mechanism 54 further includes the combination of an electric motor 54a and a gearbox 91 as well as a trolley mechanism 54b. As shown in FIG. 6, electric motor 54a is energized by a source of electricity via electrical lead 90. Rotational displacement of an output shaft (not shown) of electric motor 54a is converted to the proper RPMs by gearbox 91 which is, in turn, coupled to a first drive shaft 96. The combination of electric motor 54a and gearbox 91 is securely mounted to support panel 92 by means of first and second mounting brackets 94a and 94b which are connected to the gearbox. Disposed on opposed ends of the first drive shaft 96 are first and second sprockets 98a and 98b. First and second sprockets 98a, 98b are respectively coupled by means of first and second drive chains 100 and 102 to third and fourth sprockets 110a and 110b. The third and fourth sprockets 110a, 110b are mounted on opposed ends of a second drive shaft 106 which is mounted to the support panel 92 by means of the combination of a mounting bracket 136 and a nut and bolt combination 138. One end of the second drive shaft 106 is connected to a first curtain drive/support rod 104, while an opposed end of the second drive shaft is connected to a second curtain drive/support rod 108. The first curtain drive/support rod 104 is connected to a lower hem portion of the second lower curtain section 64, while the second curtain drive/support rod 108 is connected to a lower hem portion of the first lower curtain section 44. It should be noted here that the second drive shaft 106 may also be connected to an intermediate hem portion of a curtain section as shown for the case of a drive shaft 136 of the second intermediate support/drive mechanism 52 connected to intermediate hems of the first and second intermediate curtain sections 42, 62. Thus, in accordance with the present invention, the combination of a support/drive mechanism may be connected to an intermediate hem or a bottom hem of a curtain section. Rotational displacement of the output shaft (not shown) of electric motor 54a is converted and transmitted via the combination of gearbox 91, first drive shaft 96, first and second sprockets 98a, 98b, first and second drive chains 100, 102, third and fourth sprockets 110a, 110b, and second drive shaft 106 to the proper rotational speed for rolling up and unrolling the first and second lower curtain sections 44 and 64. It should also be noted here that while the aforementioned support/drive mechanisms are each described as including an electric motor, the present invention is not limited to the use of electric motors and may make use of virtually any source of rotational motion properly sized and scaled, including a manual drive mechanism as described in detail below.

The trolley mechanism 54b of the third lower support/drive mechanism 54 includes its support panel 92 to which are rotationally mounted first, second, third and fourth rollers 112a-112d. Each of the aforementioned rollers, or wheels, 112a-112d are by means of a respective axle, such as shown for the case of the third and fourth rollers 112c, 112d, respectively attached to the support panel by means of axles 114a and 114b. Each of the rollers 112a-112d is adapted for engagement with a respective one of the second and third vertical guide members 72, 74 and to the controller housing's rear wall 39. Thus, rollers 112a and 112d are adapted for engagement with second vertical guide member 72 and rear wall 39, while rollers 112b and 112c are adapted for engagement with third vertical guide member 74 and the rear wall. Thus, rollers 112a-112d are positioned between and in contact with the housing's rear wall 39 and a respective one of the first, second or third vertical guide members 70, 72 and 74 for limiting movement of the three support/drive mechanisms 50, 52 and 54 to a vertical plane for insuring vertical alignment and displacement of the curtain sections.

The use of only three vertical guide members and two vertical offset paths of travel of the three support/drive mechanisms 50, 52 and 54 minimizes the horizontal width of the curtain controller's housing 36 to allow for increased curtain section lengths in spanning the opening in a lateral portion of structure 28. This permits additional air to be moved through the space within structure 28 and allows for enhanced control of the environment within the structure's inner space. The vertically offset curtain drive arrangement of the present invention also allows the plural vertically aligned curtain sections to be individually and independently rolled up or unrolled to provide more precise control of the extent of airflow between adjacent curtain sections as well as through the entire roll-up curtain arrangement. In addition, by optimally orienting the components of each of the three support/drive mechanisms 50, 52 and 54, the vertical dimensions of the curtain controller's housing 36 is also minimized and vertical displacement of the upper and lower curtain support/drive mechanisms is increased. More particularly, the orientation of the respective motors 50a and 54a in the first upper and third lower support/drive mechanisms 50, 54 is reversed eliminating the requirement to expand the vertical dimensions of housing 36, while still allowing the first, second and third curtain sections to fully span the vertical dimension of the lateral opening in structure 28. Positioning electric motors 50a and 50b in opposed relative orientations allows for a reduction in the vertical dimension of housing 36 and increases the vertical dimensions of the openings provided by the upper and lower curtain sections when rolled up to increase the flow of air through structure 28.

Figure 8:
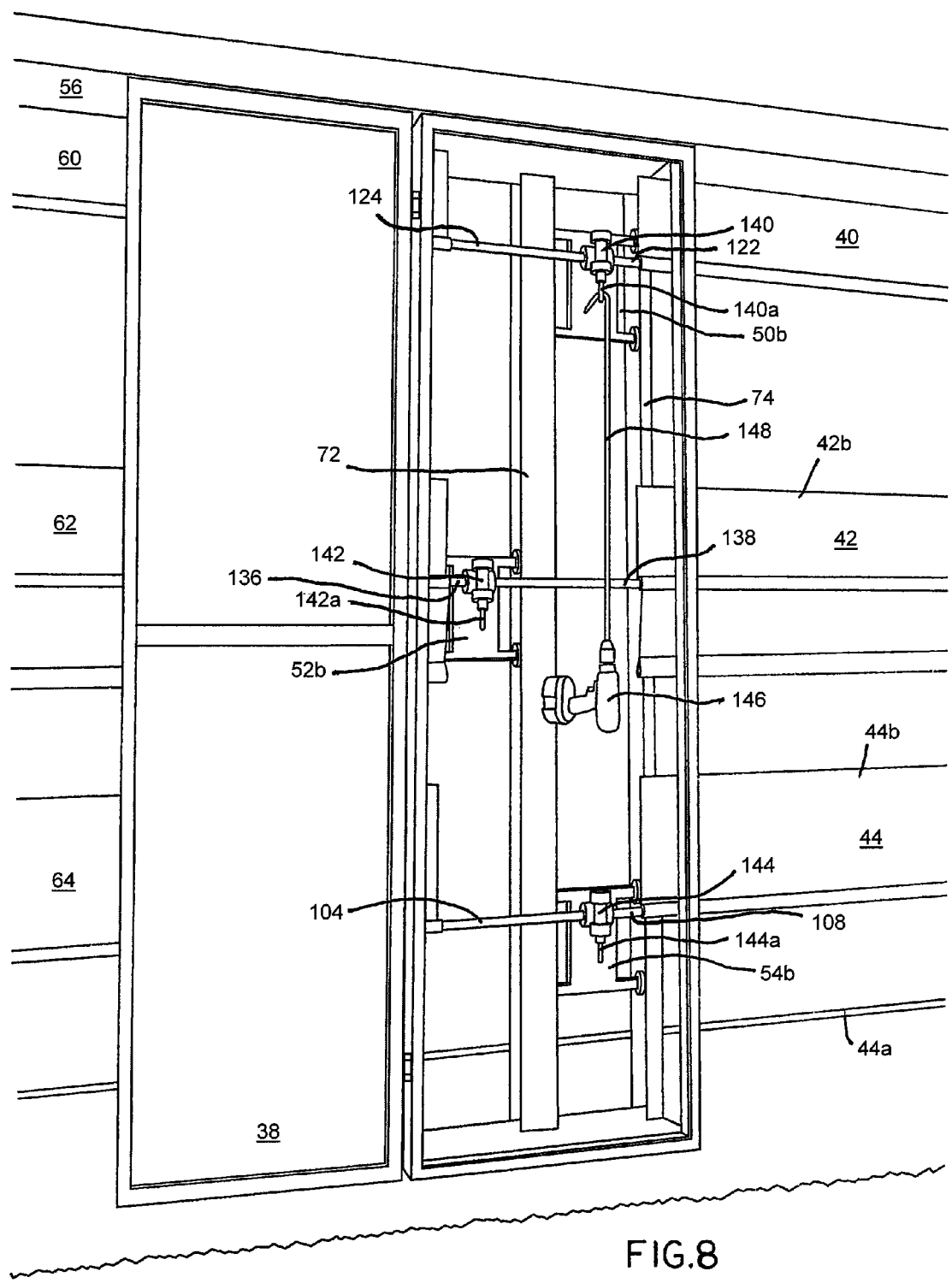
FIG. 8 is a front perspective view of another embodiment of the present invention employing a manual drive arrangement for rolling up and unrolling the curtain sections.

Referring to FIG. 8, there is shown another embodiment of a cross ventilation curtain system in accordance with the principles of the present invention. The cross ventilation curtain system shown in FIG. 8 is similar to the cross ventilation curtain system shown in FIG. 3. Thus, common elements in both of the cross ventilation curtain systems shown in FIGS. 3 and 8 having the same configuration and performing the same function have been provided with the same identifying element number in the two figures. The different between the two cross ventilation curtain systems shown in FIGS. 3 and 8 is in the manner in which the individual curtain sections are rolled up and unrolled. More specifically, the cross ventilation curtain system shown in FIG. 3 employs first, second and third electric motors 50a, 52a and 54a to raise and lower the upper, intermediate and lower curtain sections 40, 42 and 44, respectively. In the embodiment of applicant's invention shown in FIG. 8, the upper, intermediate and lower curtain sections 40, 42 and 44 are raised and lowered by means of first, second and third mechanical drives 140, 142 and 144. Each of the first, second and third mechanical drives 140, 142 and 144 is adapted for providing rotary drive for an associated coupled curtain section by means of a power unit 146, which in FIG. 8 is shown as a conventional electric drill. Power unit 146 is adapted for engaging and rotationally driving by means of an extension rod 148 a respective adapter 140a, 142a and 144a disposed in the first, second and third mechanical drives 140, 142 and 144.

While particular embodiments of the present invention have been described, it will be obvious to those skilled in the relevant arts that changes and modifications may be made without departing from the invention in its broader aspects. Therefore, the aim in the appended claims is to cover all such changes and modifications that fall within the true spirit and scope of the invention. The matters set forth in the foregoing description and accompanying drawings is offered by way of illustration only and is not a limitation. The actual scope of the invention is intended to be defined in the following claims when viewed in their proper perspective based on the prior art.

I claim:

1. For use in a generally closed space defined by plural structural members and having a first lateral peripheral portion, an arrangement for controlling airflow in the generally closed space comprising:

first upper, first intermediate and first lower curtain sections arranged in vertical spaced alignment and covering the first lateral peripheral portion of said space, wherein each of said first upper, intermediate and lower curtain sections includes a respective upper edge portion fixedly attached to a structural member and a respective free lower edge portion attached to a respective roll-up rod;

first, second and third rotary drive and trolley combinations each respectively coupled to a roll-up rod of said first upper, intermediate and lower curtain sections for independently rolling up or unrolling said curtain sections relative to the fixed upper edge portion of the curtain section, wherein each rotary drive and trolley combination moves upward to roll-up its associated curtain section and moves downward to unroll its associated curtain section; and a vertical guide coupled to said rotary drive and trolley combinations for limiting movement of the roll-up rods attached to a lower edge portion of each curtain section to a generally vertical plane during rolling up and unrolling of said curtain sections in controlling airflow in the generally closed space, said vertical guide including a first track arrangement engaging said first and third rotary drive and trolley combinations and a second track arrangement engaging said second rotary drive and trolley combination, wherein said first and second track arrangements are arranged in a horizontally spaced manner from one another for maintaining said first and third rotary drive and trolley combinations in a horizontally spaced manner from said second rotary drive and trolley combination and allowing said first and third rotary drive and trolley combinations and said second rotary drive and trolley combination to move upward and downward in a vertically offset manner.

2. The arrangement of claim 1, wherein the structural members include generally vertical spaced support members and fixed upper cross members disposed between and coupled to adjacent vertical spaced support members, and wherein the upper edge portion of said first upper curtain section is coupled to and supported from an upper cross member and said first intermediate and lower curtain sections are attached to adjacent vertical spaced support members.

3. The arrangement of claim 1 further comprising one or more restraining members disposed adjacent to intermediate portions of said first upper, intermediate and lower curtain sections for engaging said curtain sections and preventing substantial bending of said curtain sections caused by airflow.

4. The arrangement of claim 3, wherein each of said restraining members includes a pair of vertical, elongated members disposed on opposed sides of said curtain sections and in closely spaced relation thereto.

5. The arrangement of claim 1, wherein said generally closed space further includes a second lateral peripheral portion including at least one air displacement means for drawing air through said first lateral peripheral portion into the generally closed space and discharging the drawn air from the generally closed space.

6. The arrangement of claim 5, wherein said air displacement means includes plural spaced exhaust fans disposed over said second lateral peripheral portion.

7. The arrangement of claim 6, wherein said first upper, intermediate and lower curtain sections form a first outer wall of a generally closed structure formed of said structural members and defining said closed space and said plural spaced fans form a second outer wall of said generally closed structure.

8. The arrangement of claim 7, wherein said first and second outer walls are disposed in opposed relation in said generally closed structure.

9. The arrangement of claim 1 further comprising a water curtain disposed in spaced relation to and inwardly from said first upper, intermediate and lower curtain sections for introducing moisture in the airflow through said curtain sections.

10. The arrangement of claim 9, wherein said water curtain extends substantially the height and width of said curtain sections.

11. The arrangement of claim 1 further comprising at least one mist device disposed in or adjacent to said generally closed space for introducing moisture in the airflow through said curtain sections.

12. The arrangement of claim 1, wherein said first lateral peripheral portion of said space includes first and second laterally spaced sections, and wherein said first upper, first intermediate and first lower curtain sections are disposed over the first section of said first lateral peripheral portion, said arrangement further comprising second upper, second intermediate and second lower curtain sections each having a respective upper edge portion fixedly attached to a structural member and a respective free lower edge portion attached to a respective roll-up rod, and wherein the roll-up rods of said second upper, second intermediate and second lower curtain sections are respectively coupled to said first, second and third rotary drive and trolley combinations for simultaneously rolling up or unrolling said first curtain sections and said second curtain sections.

13. The arrangement of claim 12, wherein said first curtain sections and said second curtain sections are disposed on opposed sides of said rotary drive and trolley combinations and said vertical guide.

14. The arrangement of claim 1 further comprising first, second and third pairs of upper and lower limit switches respectively disposed adjacent to and actuated by the movement of said first, second and third rotary drive and trolley combinations for limiting the upward and downward movement of said first upper, intermediate and lower curtain sections.

15. The arrangement of claim 14, wherein each limit switch includes a respective pivoting arm engaged by a roll-up rod of an adjacent curtain section for limiting the upward and downward movement of the adjacent curtain section.

16. The arrangement of claim 15, wherein said limit switches are disposed adjacent said vertical guide.

17. The arrangement of claim 1, wherein said rotary drive and trolley combinations each include plural rollers each adapted to engage and travel along a respective track arrangement.

18. The arrangement of claim 17, wherein said first and second track arrangements include plural spaced vertical tracks and wherein each rotary drive and trolley combination is disposed between a pair of adjacent vertical tracks, and wherein the rollers of each rotary drive and trolley combination engage and travel along adjacent vertical tracks.

19. The arrangement of claim 17, wherein said vertical guide structure includes first, second and third spaced vertical tracks, and wherein the rollers of said first and third rotary drive and trolley combinations engage and travel along said first and second vertical tracks and the rollers of said second rotary drive and trolley combination engage and travel along said second and third vertical tracks.

20. The arrangement of claim 19, wherein said first and third rotary drive and trolley combinations are disposed between said first and second vertical tracks and said second rotary drive and trolley combination is disposed between said second and third vertical tracks.

21. The arrangement of claim 18, wherein said rotary drive and trolley combinations each include at least one first roller and at least one second roller disposed on opposed sides of the rotary drive and trolley combination, and wherein said at least one first roller engages and travels along a first vertical track and said at least one second roller engages and travels along a second adjacent vertical track.

22. The arrangement of claim 21, wherein each of said rotary drive and trolley combinations further includes an electric motor mounted to a support panel, and wherein said at least one first roller and said at least one second roller are attached to opposed lateral portions of said support panel.

23. The arrangement of claim 22, wherein each rotary drive and trolley combination further includes a gearbox coupling said electric motor to the roll-up rod of a curtain section for converting rotational motion of said electric motor to corresponding rotational motion of said roll-up rod.

24. The arrangement of claim 23 further comprising a drive chain and sprocket combination coupling said gearbox to said roll-up rod in each of said rotary drive and trolley combinations.

25. The arrangement of claim 24, wherein each drive chain and sprocket combination includes first and second opposed sprockets attached to said gearbox and further attached by a respective chain to third and fourth sprockets respectively attached to first and second roll-up curtain rods disposed on opposed sides of said rotary drive and trolley combination.

26. The arrangement of claim 21, wherein each of said rotary drive and trolley combinations further includes a manual drive mechanism mounted to a support panel, and wherein said at least one first roller and said at least one second roller are attached to opposed lateral portions of said support panel.

27. For use in a generally closed space defined by plural structural members and having a first lateral peripheral portion, an arrangement for controlling airflow in the generally closed space comprising:

first upper, first intermediate and first lower curtain sections arranged in vertical spaced alignment and covering the first lateral peripheral portion of said space, wherein each of said first upper, intermediate and lower curtain sections includes a respective upper edge portion fixedly attached to a structural member and a respective free lower edge portion attached to a respective roll-up rod;

first, second and third rotary drive and trolley combinations each respectively coupled to a roll-up rod of said first upper, intermediate and lower curtain sections for independently rolling up or unrolling said curtain sections relative to the fixed upper edge portion of the curtain section, wherein each rotary drive and trolley combination moves upward to roll-up its associated curtain section and moves downward to unroll its associated curtain section;

a vertical guide coupled to said rotary drive and trolley combinations for limiting movement of the roll-up rods attached to a lower edge portion of each curtain section to a generally vertical plane during rolling up and unrolling of said curtain sections in controlling airflow in the generally closed space, said vertical guide including a first track arrangement engaging said first and third rotary drive and trolley combinations and a second track arrangement engaging said second rotary drive and trolley combination, wherein said first and second track arrangements are arranged in a horizontally spaced manner from one another for maintaining said first and third rotary drive and trolley combinations in a horizontally spaced manner from said second rotary drive and trolley combination and allowing said first and third rotary drive and trolley combinations and said second rotary drive and trolley combination to move upward and downward in a vertically offset manner;

and an air displacement device for directing an airflow between said curtain sections and into the generally closed space; and at least one mist device disposed in or adjacent to the generally closed space for introducing moisture in the airflow through said curtain sections and within the generally closed space.

28. The arrangement of claim 27, wherein each of said rotary drive and trolley combinations includes a manual or electric motor drive mechanism.

29. For use in a generally closed space defined by plural structural members and having a first lateral peripheral portion, an arrangement for controlling airflow in the generally closed space comprising:

first upper, first intermediate and first lower curtain sections arranged in vertical spaced alignment and covering the first lateral peripheral portion of said space, wherein each of said first upper, intermediate and lower curtain sections includes a respective upper edge portion fixedly attached to a structural member and a respective free lower edge portion attached to a respective roll-up rod;

first, second and third manual rotary drive and trolley combinations each respectively coupled to a roll-up rod of said first upper, intermediate and lower curtain sections for independently rolling up or unrolling said curtain sections relative to the fixed upper edge portion of the curtain section, wherein each manual rotary drive and trolley combination moves upward to roll-up its associated curtain section and moves downward to unroll its associated curtain section; and a vertical guide coupled to said manual rotary drive and trolley combinations for limiting movement of the roll-up rods attached to a lower edge portion of each curtain section to a generally vertical plane during rolling up and unrolling of said curtain sections in controlling airflow in the generally closed space, said vertical guide including a first track arrangement engaging said first and third rotary drive and trolley combinations and a second track arrangement engaging said second rotary drive and trolley combination, wherein said first and second track arrangements are arranged in a horizontally spaced manner from one another for maintaining said first and third rotary drive and trolley combinations in a horizontally spaced manner from said second rotary drive and trolley combination and allowing said first and third manual rotary drive and trolley combinations and said second manual rotary drive and trolley combination to move upward and downward in a vertically offset manner.

* * * * *